United States Patent
Dierker

(10) Patent No.: US 7,385,014 B2
(45) Date of Patent: Jun. 10, 2008

(54) USE OF ETHYLENICALLY UNSATURATED ISOCYANATE DERIVATIVES FOR COVALENTLY BONDING IMPURITIES IN CURABLE COMPOSITIONS HAVING ACTIVE HYDROGEN ATOMS

(75) Inventor: Sascha Dierker, Merching (DE)

(73) Assignee: Hilti Aktiengesellschaft, Schaan (LI)

( * ) Notice: Subject to any disclaimer, the term of this patent is extended or adjusted under 35 U.S.C. 154(b) by 87 days.

(21) Appl. No.: 11/035,658

(22) Filed: Jan. 14, 2005

(65) Prior Publication Data
US 2005/0187357 A1 Aug. 25, 2005

(30) Foreign Application Priority Data
Jan. 15, 2004 (DE) .................. 10 2004 002 192

(51) Int. Cl.
*C08F 283/04* (2006.01)
(52) U.S. Cl. ............. 525/455; 525/457; 525/461
(58) Field of Classification Search ........... 525/455, 525/457, 461
See application file for complete search history.

(56) References Cited

U.S. PATENT DOCUMENTS 5,098,788 A * 3/1992 Petrie et al. ............ 428/394

* cited by examiner

*Primary Examiner*—Robert D. Harlan
(74) *Attorney, Agent, or Firm*—Abelman Frayne & Schwab

(57) ABSTRACT

The use of ethylenically unsaturated isocyanate derivatives of the general Formula (I)

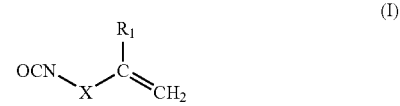

as an agent for covalently bonding impurities, plasticizers and or desensitizing agents, having active hydrogen atoms, is described in curable compositions based on ethylenically unsaturated monomers, oligomers and polymers as resin component and organic peroxides, preferably benzoyl peroxide, as curing agent.

6 Claims, No Drawings

USE OF ETHYLENICALLY UNSATURATED ISOCYANATE DERIVATIVES FOR COVALENTLY BONDING IMPURITIES IN CURABLE COMPOSITIONS HAVING ACTIVE HYDROGEN ATOMS

BACKGROUND OF THE INVENTION

1. Field of the Invention

The subject matter of the present invention is the use of certain ethylenically unsaturated isocyanates as agents for covalently bonding impurities in curable compositions having active hydrogen atoms on the basis of ethylenically unsaturated monomers, oligomers and polymers as resin components and organic peroxides as curing agents.

2. Description of the Prior Art

Curable compositions on the basis of ethylenically unsaturated monomers, oligomers and polymers, especially vinyl esters and (meth)acrylate esters are used to a large extent in the building sector as dowel compositions and fastening mortars, for example, for anchor rods and the like. The resin component and the curing agent component are in separate containers and, after the constituents are mixed, react with one another with curing of the curable composition. The resin component as well as the curing agent component frequently contain compounds having active hydrogen atoms, such as water in the form of moisture, or also desensitizing agents for the organic peroxide, such as phthalates, glycerol or similar monohydric or multihydric alcohols. These compounds, having active hydrogen atoms, are disadvantageous, insofar as they function as plasticizers in the cured network and consequently may affect the strength properties of the latter.

The object of the present invention is to prevent the harmful effect of such compounds, which contain active hydrogen atoms and are unavoidable in the curable compositions of the type under consideration, on the physical strength properties of the cured resin composition.

SUMMARY OF THE INVENTION

Surprisingly, it has now turned out that this objective can be accomplished owing to the fact that certain ethylenically unsaturated isocyanate compounds, which react with these compounds having active hydrogen atoms and tie them into the cured network by covalent bonding, are incorporated in the resin component and/or the curing agent component. By these means, the possibility is eliminated that these compounds, for example, the phthalates, desensitizing agents, glycerol and alcohols, act as plasticizers in the cured network and, by so doing, affect the desired mechanical strength properties.

The subject matter of the invention therefore is a method of using ethylenically unsaturated isocyanate derivatives of the general formula (1):

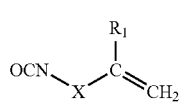
(I)

comprising the step of selecting X from the group consisting of formulae $X_1$, $X_2$, $X_3$ and $X_4$:

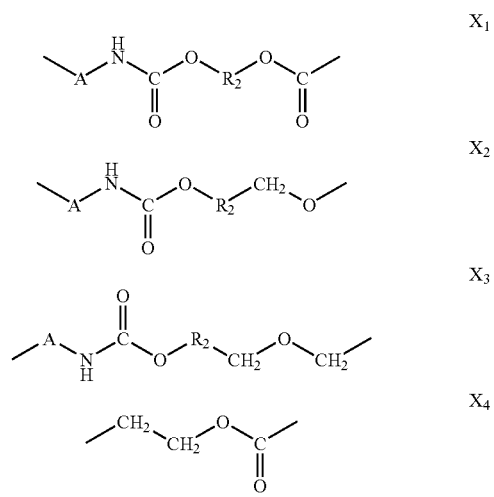

where A is a linear or branched alkylene group with 4 to 6 carbon atoms or a group selected from a group consisting of formulae $A_1$, $A_2$, $A_3$, $A_4$, $A_5$ and $A_6$:

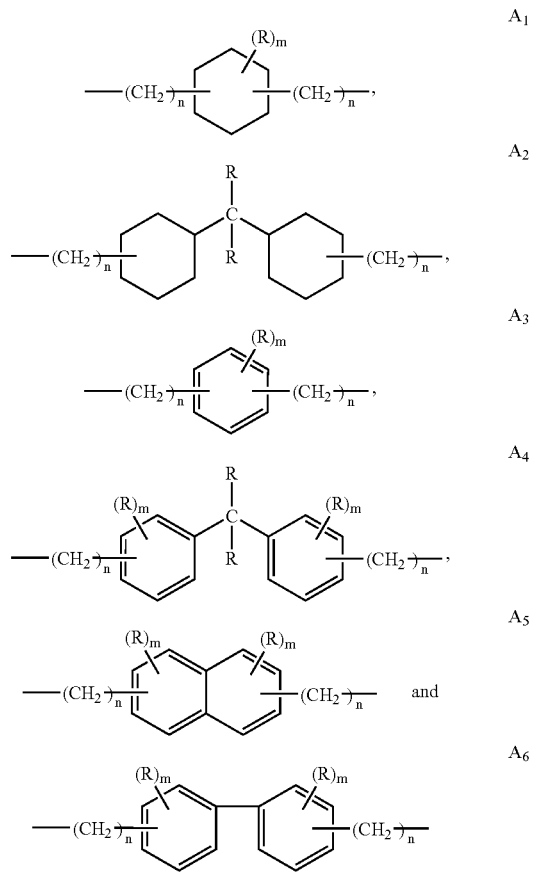

(in which R independently of one another represent hydrogen atoms or methyl groups, m represents a whole number with values of 0 or 1 and n represents whole number with values of 0 to 4), $R_1$ represents a hydrogen atom or a methyl group, and $R_2$ represents a linear or branched alkylene group with 1 to 6 carbon atoms, as agents for covalently bonding impurities, plasticizers and/or desensitizing agents, having active hydrogen atoms, in curable compositions based on ethylenically unsaturated monomers, oligomers and polymers as resin components, and organic peroxides as curing agent. The dependent claims relate to preferred embodiments of this inventive object.

Preferably, at least one representative of the group comprising diphenylmethane-4-isocyanato-4'-urethaneethylene methacrylate, toluene-2-urethaneethylenemethacrylate-6-isocyanate, diphenylmethane-4-isocyanato-4'-urethaneethylene acrylate, toluene-2-urethaneethyleneacrylate-6-isocyanate, diphenylmethane-4-isocyanato-4'-urethanepropylene acrylate, toluene-2-urethanepropyleneacrylate-6-isocyanate and 2-isocyanatoethyl methacrylate, is used as ethylenically unsaturated isocyanate of the present invention.

Pursuant to the invention, the ethylenically unsaturated isocyanates of the general Formula (I) are used preferably for bonding water, monohydric or multihydric alcohols, preferably glycerol, polyethylene glycol with molecular weights ranging from 62 to 750, polypropylene glycol with molecular weights ranging from 76 to 3500 and phthalate plasticizers in dowel and/or fastening compositions.

In accordance with a further preferred embodiment of the invention, the ethylenically unsaturated isocyanate derivatives of the general Formula (I) are used in combination with additional moisture-binding agents in the dowel and/or fastening compositions under consideration, preferably zeolites, molecular sieves with pore widths of 2 Å to 9 Å, preferably of 3 Å to 6 Å and especially of 3 Å to 4 Å, which enable water, but not ethylenically unsaturated monomers of the resin components to be absorbed, alumina, alumina cements, iron oxide-free Portland cement or Portland cement low in iron oxide, such as "Dyckerhoff Weiß", calcium oxide, calcium sulfate, calcium sulfate hydrate such as calcium sulfate hemihydrate, or mixtures thereof being used as moisture-binding agents.

According to a further preferred embodiment of the invention, the ethylenically unsaturated isocyanate derivatives of the general Formula (I), used pursuant to the invention, together with the resin component, are contained in a first component of a two-component fastening mortar or a two-component dowel composition and the curing agent is contained in a separate second component, the two components being in separate containers, from which they may be expressed, for example, using pressure, and mixed to initiate the curing reaction.

The ethylenically unsaturated isocyanate derivatives of the general Formula (I), used pursuant to the invention, are either commercially available or obtainable by methods of organic synthesis known to those skilled in the art, for example, by reacting an isocyanate with an equivalent amount of a hydroxyl-containing (meth)acrylate. For example, 4,4'-diphenylmethane diisocyanate, 2,4'-diphenylmethane diisocyanate (MDI), 1,6-hexamethylene diisocyanate (HDI), isophorone diisocyanate (IPDI) may be used as isocyanate and hydroxybutyl-methacrylate (HMPA) may be used as hydroxyl-containing (meth)acrylate.

Pursuant to the invention, it is possible to use said isocyanate compounds also in the form of mixtures of isomers, so that mixtures of the ethylenically unsaturated isocyanate derivatives of general Formula (I) are obtained, which are also suitable for the inventive use independently of whether the position of the functional groups varies depending on the starting material used for the synthesis.

The reaction of the isocyanate compounds with the hydroxyl group-containing (meth)acrylates can be promoted by accelerators or catalysts.

Surprisingly, it has turned out that, with the help of the inventive use of the defined, ethylenically unsaturated isocyanate derivatives of the general Formula (I), the two-component fastening mortars otherwise having an identical composition, improve the physical properties, namely the loads (pull-out force) of the cured fastening mortars in a significant manner.

DESCRIPTION OF PREFERRED EMBODIMENTS

The invention is explained further in the following examples.

EXAMPLE 1

Synthesis of a diphenylmethane-4-isocyanato-4-urethanepropylene methacrylate 4,4,-Diphenylmethane diisocyanate is transferred to a reactor and an equivalent amount of hydroxypropyl methacrylate is added with stirring at a temperature of 40° C. After the dropwise addition of the hydroxypropyl methacrylate has been completed, the source of heat is removed and stirring is continued until the temperature, which rises initially because of the heat of reaction, has dropped once again.

In the same way, starting on from 2,6-toluene isocyanate and hydroxypropyl methacrylate, toluene-2-urethanepropylene methacrylate-6-isocyanate is obtained. The remaining ethylenically unsaturated isocyanate derivatives of the general Formula (I), which are used pursuant to the invention, are obtained in the same way using appropriate starting materials.

EXAMPLES 2 to 4 AND COMPARISON EXAMPLE A

To illustrate the technical effect achieved by the inventive use of the defined ethylenically unsaturated isocyanate derivatives of the general Formula (I), two-component fastening mortars were produced using the constituents given in the following Table. The comparison example A did not contain any isocyanate derivative, which is used pursuant to the invention. On the other hand, the fastening mortars of Examples 2 to 4 contain commercially obtainable 2-isocyanateethyl methacrylate as ethylenically unsaturated isocyanate of the general Formula (I), used pursuant to the invention, in different amounts.

After the resin component and the curing component where produced by appropriately mixing the constituents given, the two components were mixed for the intended use and where then introduced into drilled holes with an internal diameter of 14 mm and a depth of 110 mm in concrete of quality B 25. Subsequently, a threaded rod M12 was placed into the drilled hole filled with the fastening mortar and the composition was allowed to curve for one hour at room temperature. Subsequently, the pulling out value in kN was determined with the help of a hydraulic pulling device. For each mortar composition, 10 experiments were carried out. The loads, given in the following Table, in each case represent the average of 10 experiments.

| Constituents | Comparison A % by wt. | Example 2 % by wt. | Example 3 % by wt. | Example 4 % by wt. |
|---|---|---|---|---|
| Resin Component: | | | | |
| Vinyl ester resin:* | 10.79 | 8.79 | 10.79 | 10.79 |
| 2-Isocyanatoethyl methacrylate: | 0.00 | 9.47 | 0.41 | 3.25 |
| Butylene glycol dimethacrylate: | 4.76 | 4.76 | 4.76 | 4.76 |
| Hydroxypropyl methacrylate: | 12.18 | 4.71 | 11.77 | 8.93 |
| Diethylaniline: | 0.54 | 0.54 | 0.54 | 0.54 |
| Hydroquinone: | 0.095 | 0.095 | 0.095 | 0.095 |
| Quartz sand 0-0.9 mm | 42.795 | 42.795 | 42.795 | 42.795 |
| Pyrogenic silica | 2.19 | 2.19 | 2.19 | 2.19 |
| Curing Agent Component: | | | | |
| Benzoyl peroxide | 1.75 | 1.75 | 1.75 | 1.75 |
| Glycerol | 5.59 | 5.59 | | |
| Propylene glycol 3500 | | | 5.59 | |
| Polyethylene glycol 400 | | | | 5.59 |
| Finely ground quartz 0-0.150 mm | 19.09 | 19.09 | 19.09 | 19.09 |
| Pyrogenic silica | 0.22 | 0.22 | 0.22 | 0.22 |
| | 100 | 100 | 100 | 100 |
| Load [kN]* | 75.1 | 82.3 | 84.6 | 83.4 |

*Threaded rod M12, $h_{eff}$: 110 mm
Drill diameter: 14 mm, n = 10
*This vinyl resin is a bisphenol-A-dimethacrylate resin with four ethylene oxide groups and has the following Formula:

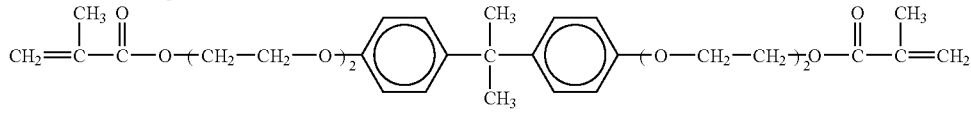

It can readily be seen from the above Table that the fastening mortars, obtained pursuant to the invention using the 2-isocyanatoethyl methacrylate as agent for covalently bonding the impurities, which are contained in the two components and have active hydrogen atoms, namely glycerol, polypropylene glycol 3500 and polyethylene glycol 400 or moisture, have abruptly improved loads in comparison to the mortar of the comparison example A, which does not contain any compound for covalently bonding these compounds.

The invention claimed is:

1. A method of using ethylenically unsaturated isocyanate derivatives of the general formula (1):

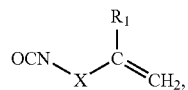
(I)

comprising the step of selecting X from the group consisting of formulae $X_1$, $X_2$, $X_3$, $X_4$:

$X_1$

-continued $X_2$ $X_3$ $X_4$ where A is a linear or branched alkylene group with 4 to 6 carbon atoms or a group selected from a group consisting of formulae $A_1$, $A_2$, $A_3$, $A_4$, $A_5$, $A_6$:

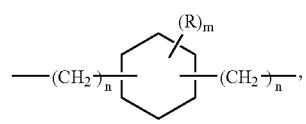

$A_1$

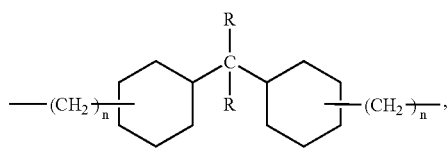

$A_2$

-continued

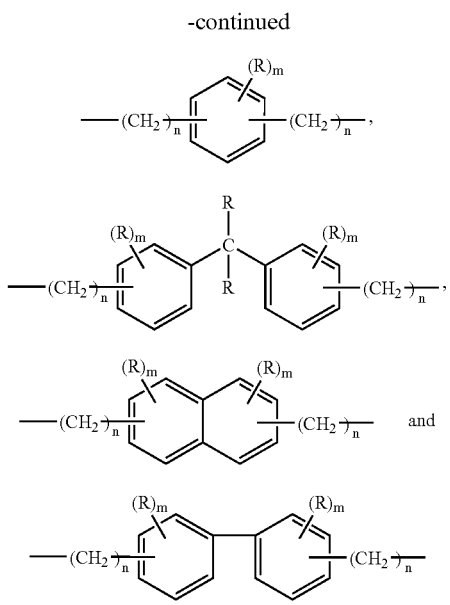

(in which R independently of one another represent hydrogen atoms or methyl groups, m represents a whole number with values of 0 or 1 and n represents whole number with values of 0 to 4), $R_1$ represents a hydrogen atom or a methyl group, and $R_2$ represents a linear or branched alkylene group with 1 to 6 carbon atoms as agents for covalently bonding water, monohydric or multihydric alcohols, glycerol, polyethtylene glycol with weight average molecular weights ranging from 62 to 750, polypropylene glycol with weight average molecular weights ranging from 76 to 3500, and phthalate plasticizers in dowel and/or fastening compositions based on ethylenically unsaturated monomers, oligomers and polymers as resin components and organic peroxides as curing agent, wherein the ethylenically unsaturated isocyanate derivatives of the general formula (I) together with the resin component, are in a first component of a two-component fastening mortar and the curing agent is in a separate second component.

2. The method of claim 1, characterized in that at least one representative of the group comprising diphenylmethane-4-isocyanato-4'-urethaneethylene methacrylate, toluene-2-urethaneethylenemethacrylate-6-isocyanate, diphenylmethane-4-isocyanato-4'-urethaneethylene acrylate, toluene-2-urethaneethyleneacrylate-6-isocyanate, diphenylmethane-4-isocyanato-4'-urethanepropylene acrylate, toluene-2-urethanepropyleneacrylate-6-isocyanate and 2-isocyanatoethyl methacrylate, is used as the ethylenically unsaturated isocyanate.

3. The method of claim 1, characterized in that the ethylenically unsaturated isocyanate derivatives of the general Formula (I) are used in combination with moisture-binding agents in a dowel composition and/or fastening composition.

4. The method of claim 1, characterized in that as a curing agent in a curable composition, benzoyl peroxide is used.

5. The method of claim 3, characterized in that as moisture-binding agents, zeolites, molecular sieves with pore widths of 2 Å to 9 Å which enable water, but not ethylenically unsaturated monomers to be absorbed and which are selected from a group consisting of alumina, alumina cements, iron oxide-free Portland cement calcium oxide, calcium sulfate, or mixtures thereof are used.

6. The method of claim 5, wherein the molecular sieves have pore widths of 3 Å to 6 Å.

* * * * *